(No Model.)  2 Sheets—Sheet 1.
A. JOHNSON.
CAN END SOLDERING MACHINE.
No. 566,079.  Patented Aug. 18, 1896.
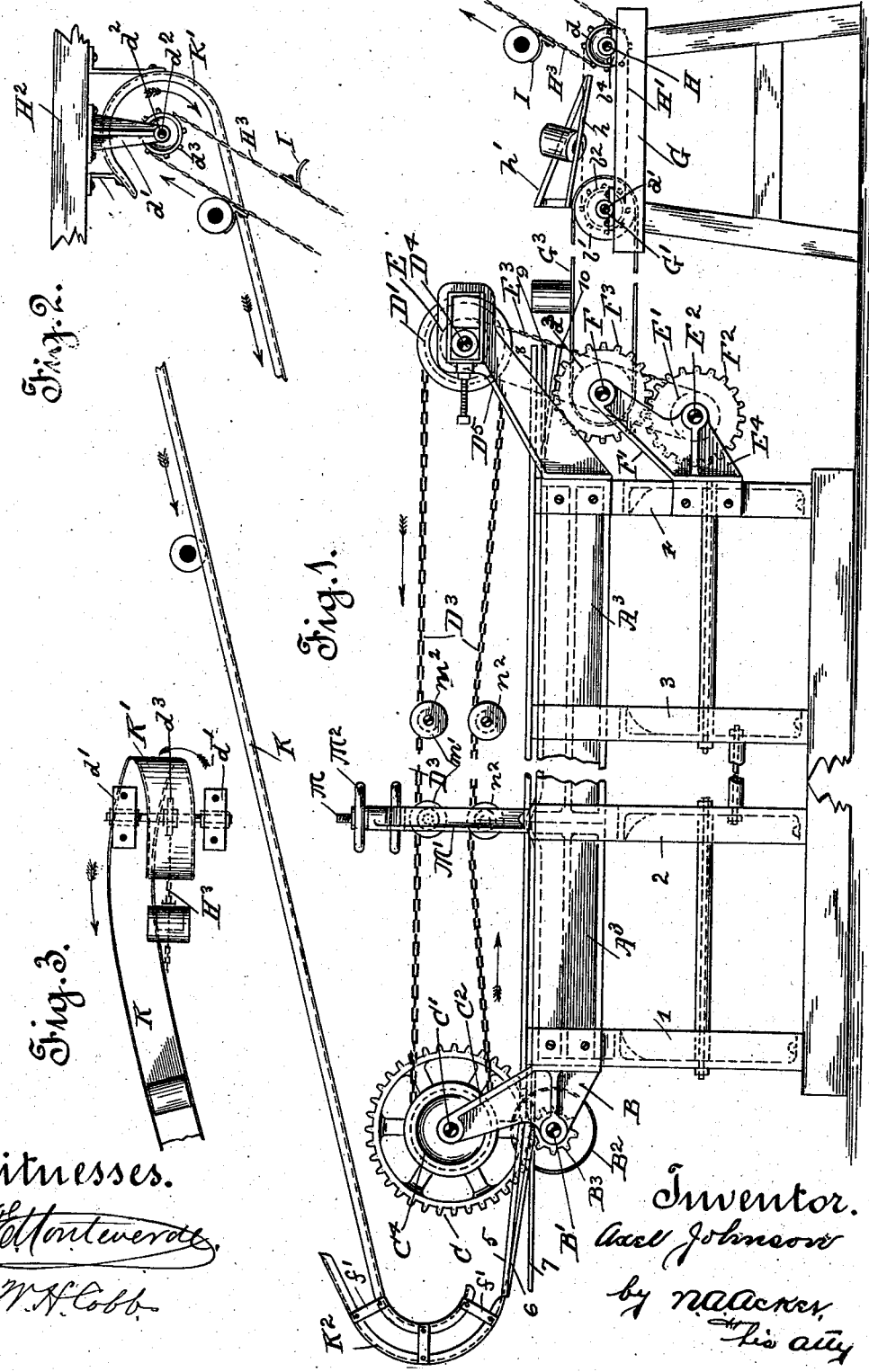
Witnesses.
F. H. Monteverde
W. H. Cobb
Inventor.
Axel Johnson
by N. A. Acker,
his atty

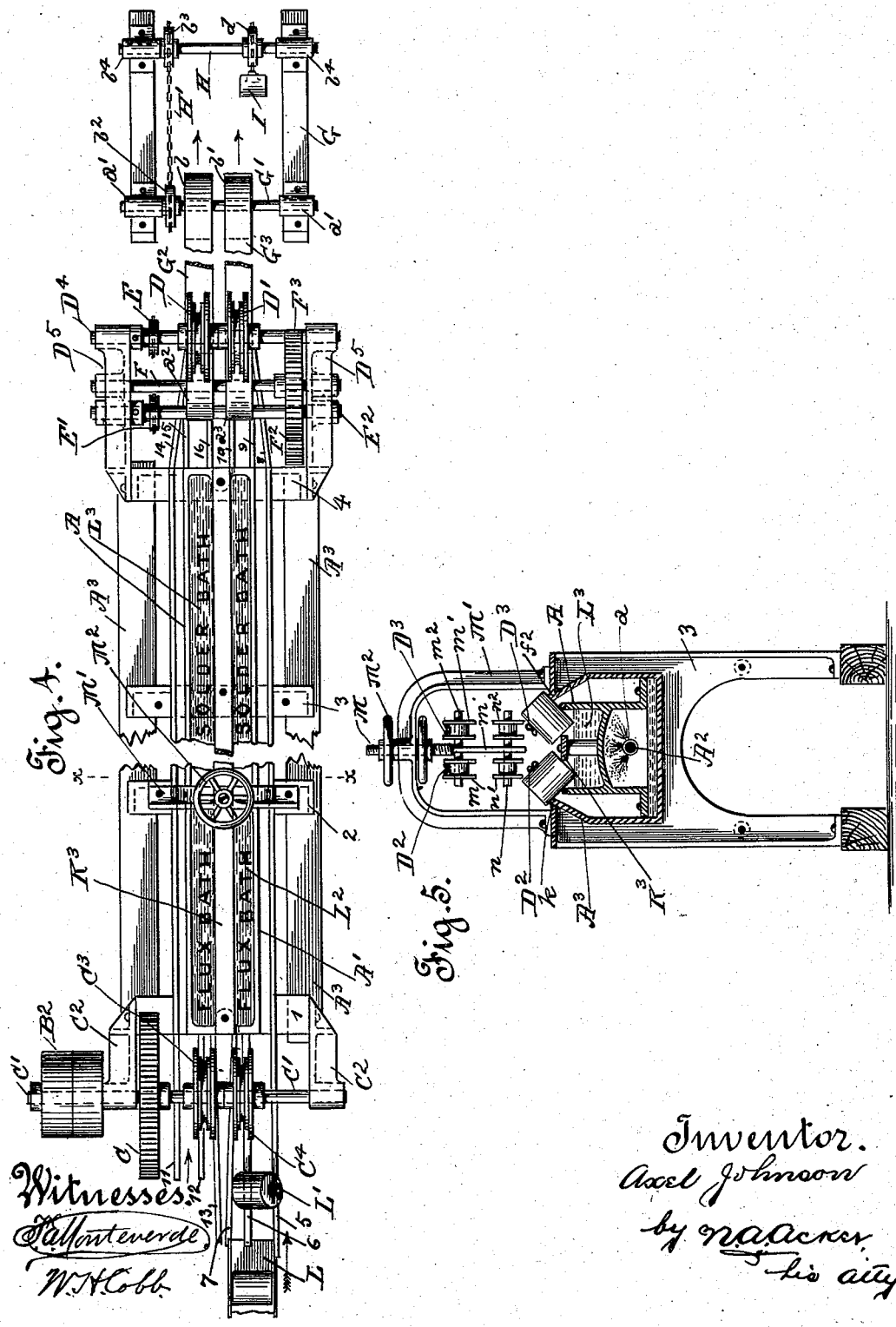

United States Patent Office.

AXEL JOHNSON, OF OAKLAND, CALIFORNIA.

CAN-END-SOLDERING MACHINE.

SPECIFICATION forming part of Letters Patent No. 566,079, dated August 18, 1896.

Application filed March 25, 1896. Serial No. 584,798. (No model.)

*To all whom it may concern:*

Be it known that I, AXEL JOHNSON, a citizen of the United States, residing at Oakland, in the county of Alameda and State of California, have invented certain new and useful Improvements in Can-End-Soldering Machines; and I do hereby declare that the following is a full, clear, and exact description thereof.

This invention relates to certain new and useful improvements in can-soldering machines, and more especially to such machines used to solder the ends or tops and bottoms to the can-body, which consists in the arrangement of parts and details of construction as will be hereinafter fully set forth in the drawings and described and pointed out in the specification.

The object of the invention is to so construct the can-end-soldering machine that both ends of the can may be soldered in the same solder-bath, thereby dispensing with one solder-bath and permitting a saving in floor-space to be made and creating a saving in the fuel or gas necessary to maintain two solder-receptacles heated to melt the solder, so as to form two solder-baths through which the cans are carried.

In order to fully understand the invention, reference must be had to the accompanying sheets of drawings, forming a part of this application, wherein—

Figure 1 is a broken side view in elevation of the soldering apparatus, the can-elevator and part of the return runway or chute being removed. Fig. 2 is a detail side view in elevation showing the upper end portion of the can-elevator and return runway or chute which receives the cans from the elevator and conveys the same to the feed end of the machine. Fig. 3 is a detail top plan view of the upper portion of the return runway or chute for the cans. Fig. 4 is a broken top plan view of the machine with the can-elevator and return-runway removed; and Fig. 5 is a cross-sectional end view in elevation on line $x\,x$, Fig. 4.

The letter A is used to indicate the solder-holding receptacle or trough, and A' the flux-receptacle located in front thereof. These receptacles or troughs are secured within the frame $A^3$, upheld by the support 1 2 and 3 4. Below the solder receptacle or trough A is located the gas-pipe $A^2$, which is provided with a series of burners $a$, by means of which gas is supplied to heat the solder-receptacle or trough in order to melt or heat the solder contained therein. These features are well known and form no part of my present invention.

Secured to the support 1 and projecting from the feed end of the machine are the brackets B, which support the shaft B'. This shaft is driven or rotated by the pulley $B^2$ and has secured thereon the pinion $B^3$, which pinion intermeshes with the teeth of the gear-wheel C, secured upon the cross-shaft C', located above the cross-shaft B'. This cross-shaft C' works in bearings of the arms $C^2$, upwardly projecting from the brackets B, and upon the said shaft is secured the grooved wheels $C^3\ C^4$, Fig. 4. The wheel $C^3$ is connected to the wheel D at the rear or discharge end of the machine and wheel $C^4$ to wheel D' by endless chains $D^2\ D^3$.

Wheels D D' are secured upon the cross-shaft $D^4$, working in bearings of the brackets $D^5$, fastened to the support 4 and projecting from the rear or discharge end of the machine. Motion of the cross-shaft C' is imparted to the cross-shaft $D^4$ by the endless chains $D^2\ D^3$. Upon the cross-shaft $D^4$ is also secured the sprocket-wheel E, which is connected with the sprocket-wheel E', secured to the lower cross-shaft $E^2$ by endless chain $E^3$. Consequently the motion of the shaft $D^4$ is imparted to the shaft $E^2$. This shaft works in bearings of the brackets $E^4$, outwardly projecting from the support 4. A short distance above the cross-shaft $E^2$ is located the cross-shaft F, working in bearings of the arms F', upwardly projecting from the brackets $E^4$. The shaft $E^2$ has secured thereon the gear $F^2$, which meshes with the gear $F^3$, secured to the shaft F, so as to impart the motion of the said shaft $E^2$ to the shaft F.

A short distance beyond the discharge end of the machine is located the frame G. At the forward end of this frame is secured the shaft G', which works within bearing-boxes $a'$, fastened to the said frame, Figs. 1 and 4. This shaft is connected with the shaft F, so as to receive the motion thereof, by means of the endless belts $G^2\ G^3$, the belt $G^2$ traveling over belt-wheel $a^2$, secured to the shaft F, and belt-wheel $b$, secured to the shaft G', the belt $G^3$ traveling over belt-wheel $a^3$, fastened to the shaft F, and belt-wheel $b'$, fastened to the shaft G'. To the shaft G' is also secured the sprocket-wheel $b^2$, which is connected with the sprocket-wheel $b^3$, secured to the shaft H by endless chain H'. The shaft H is located at the rear end of the frame G and works within bearing-boxes $b^4$, fastened to the frame. The motion of the shaft G' is thus transmitted to the shaft H.

To the ceiling-beam $H^2$, or in any manner, above the frame G, is attached the depending hangers $d'$, which support the shaft $d^2$. This shaft is connected with the shaft H by the endless can-elevator chain $H^3$, which travels over sprocket-wheel $d$, secured to the shaft H, and sprocket-wheel $d^3$, secured to the shaft $d^2$. To the endless can-elevator chain is connected or secured a series of outwardly-projecting curved can-holding plates I, which receive the cans as delivered from the can-soldering machine and hold the same while being carried upward by the travel of the endless can-elevator chain. The cans raised by the endless can-elevator chain as carried over the sprocket-wheel $d^3$ drop into the return runway or chute K, the upper end K' of which curves over the shaft $d^2$ and is fastened to the rods $f$, bolted to and depending from the beam $H^2$. This runway or chute leads from the upper end of the endless can-elevator to the forward or feed end of the soldering-machine, the lower end thereof being curved and having secured thereto by straps $f'$ the curved guard-plate $K^2$, which prevents the cans from rolling off of the runway or chute when the lower end thereof is reached.

To the top of the solder and flux holding receptacles or troughs is secured the central strip or plate $K^3$, which divides the said receptacles or troughs and supports the ends of the cans as carried through the flux and solder baths.

Connection is made between the end of the can-runway L and the soldering-machine by the strips or rods 5 6 7, which strips or rods are run at a gradual downward incline and are arranged at such an angle to each other as to throw or tilt the can L', which leaves the runway in a horizontal position, and deliver the same to the soldering-machine in an inclined position. As the can is fed into the soldering-machine it is engaged by the endless chain $D^3$, the weight thereof serving to hold the can in position. The movement of the endless chain $D^3$ rotates the can first through the flux-bath $L^2$ and then through the solder-bath $L^3$. As carried through the machine only the lower edge of the can dips into the flux and solder baths, the body of the can resting against the edge $f^2$ of the frame $A^3$ and the bottom thereof against the edge of the central strip or plate $K^3$, Fig. 5. When the can reaches the opposite or delivery end of the machine, one end will be soldered. The can with the soldered end as discharged from the soldering-machine rolls over the inclined rods 8 9 10, which lead to the belt $G^3$. These rods are arranged at such an angle to each other that the can is placed upon the endless belt $G^3$ in a vertical position with its freshly-soldered end uppermost. As the can is moved toward the endless can-elevator by the travel of the endless belt $G^3$ the solder is allowed to cool or harden. Between the endless can-elevator $H^3$ and the discharge end of the endless belt $G^3$ is interposed the downwardly-inclined rod $h$. This rod, in connection with the deflector rod or plate $h'$, serves to force the can from an upright or vertical position into a horizontal one, Fig. 1, so as to place the can in position to be received by one of the can-plates I, secured to the endless can-elevator. The deflector plate or rod $h'$ is run at an angle to the face of the endless belt $G^3$, so that the upsetting of the can will be gradual. After the can is received upon the can-plate I it is carried upward by the endless can-elevator and discharged at its upper end into the runway K as the endless can-elevator moves over the sprocket-wheel $d^3$. When the can is dropped from the said elevator into the runway K, it rolls downwardly by gravity toward the feed end of the machine with its unsoldered or open end toward the solder-bath. The lower end of the can-runway guard $K^2$ is connected to the soldering-machine by the downwardly-inclined rods or straps 11 12 13, Fig. 4. These rods are arranged at an angle to each other, similar to the rods 5 6 7, so as to throw the can from a horizontal into an inclined position in order that it may roll through the flux-bath $L^2$ and solder-bath $L^3$ with only its unsoldered edge dipping therein. The can is carried through the flux and solder bath a second time by the travel of the endless chain $D^2$, the body of the can resting upon the edge $k$ of the frame $A^3$, and the lower end thereof against the edge of the central strip or plate $K^3$, Fig. 5. As the can leaves the solder-bath it rides upon the downwardly-inclined rods 14 15 16 until it reaches the discharge-belt $G^2$. These downwardly-inclined rods are arranged at such an angle to each other, similar to the rods 8 9 10, that the can rolling thereover is gradually thrown from an inclined to a vertical position, in which position it is placed upon the discharge-belt $G^2$, with its freshly-soldered end uppermost. As carried by this belt the solder is permitted to cool before the can reaches the discharge end thereof. The can as dropped from the discharge-belt is received into a runway (not shown) located within the frame G, which conveys the soldered can to any suitable place.

The endless chains $D^2$ $D^3$ travel over the rolls $m$ $m'$, secured to the arm $m^2$ of the rod M. The upper end of this rod is screw-threaded and projects through the yoke-plate M', secured to the frame $A^3$, Fig. 5. The rod M is raised or lowered, so as to tighten or loosen the tension of the chains $D^2 D^3$, by the hand-wheel $M^2$. Through the lower end of the rod M extends the arm $n$, upon which is secured the rolls $n'$ $n^2$. These rolls support the lower portion of the endless chains $D^2 D^3$ when the machine is not in use, so as to prevent the chains dipping into the soldering-bath.

Having thus described my invention, what I claim as new, and desire to secure protection in by Letters Patent, is—

1. In a can-end-soldering machine, the combination with a single soldering-bath, of devices for rotating the can through the bath so as to solder one end, of mechanism which receives the can with its soldered end and returns the same to the feed end of the soldering-machine with its position reversed so as to place the free or unsoldered end in line with the soldering-bath, and of devices for receiving the can in its reversed position and reconveying the same through the soldering-bath in order that the unsoldered end may be soldered.

2. In a soldering-machine, the combination with a soldering-bath, of the devices for receiving the cans and rotating the same through the soldering-bath so as to solder one end, the can-carrying elevator, of devices interposed between the can-carrying elevator and the soldering-machine which deliver the can to the said elevator in a reverse position, the can-runway leading from the upper end of the can-carrying elevator to the feed end of the soldering-machine which receives the cans from the said elevator and returns the same to the soldering-machine with the unsoldered end in line with the soldering-bath, and of devices which receive the cans and reconvey the same through the solder-bath so as to solder the free end thereof.

3. The combination with a can-end-soldering machine, of the endless can-carrying elevator which receives the can from the soldering-machine with one end soldered, the can-holding plates or seats secured to the endless can-carrying elevator, and of the return can-runway leading from the upper end of the endless can-carrying elevator to the feed end of the soldering-machine which receives the cans from the said elevator and delivers the same to the can-soldering machine with the unsoldered end in line with the soldering-bath of the machine.

4. In a soldering-machine, the combination with the solder-holding receptacle or trough, of the central strip or plate secured thereto so as to divide the same, of mechanism which receives the cans and conveys the same through the soldering-bath held within the solder receptacle or trough on one side of the central strip or plate, of devices for receiving the cans as discharged from the machine with one end soldered and reversing the position thereof and returning the same to the feed end of the machine with the unsoldered end in line with the soldering-bath, and of mechanism for receiving the cans and reconveying the same through the soldering-bath at the opposite side of the central strip or plate.

In testimony whereof I affix my signature, in presence of two witnesses, this 29th day of February, 1896.

AXEL JOHNSON.

Witnesses:
N. A. ACKER,
LEE D. CRAIG.